(12) United States Patent
Merkel

(10) Patent No.: US 6,391,813 B1
(45) Date of Patent: May 21, 2002

(54) LOW SINTERING TEMPERATURE CORDIERITE BATCH AND CORDIERITE CERAMIC PRODUCED THEREFROM

(75) Inventor: Gregory A. Merkel, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/473,376

(22) Filed: Dec. 28, 1999

Related U.S. Application Data

(60) Provisional application No. 60/114,420, filed on Dec. 31, 1998.

(51) Int. Cl.⁷ .............................................. C04B 35/195
(52) U.S. Cl. ............................ 501/119; 501/9; 501/128
(58) Field of Search ............................... 501/9, 128, 119

(56) References Cited

U.S. PATENT DOCUMENTS

| | | |
|---|---|---|
| 3,885,977 A | 5/1975 | Lachman et al. |
| 4,300,953 A | 11/1981 | Lachman |
| 4,403,017 A | 9/1983 | Bind |
| 4,745,092 A | 5/1988 | Prunier et al. |
| 4,888,314 A | 12/1989 | Bernier et al. |
| 4,956,137 A | 9/1990 | Dwivedi |
| 5,011,804 A | 4/1991 | Bergna et al. |
| 5,173,455 A | 12/1992 | Terbot et al. |
| 5,175,132 A | 12/1992 | Ketcham et al. |
| 5,258,150 A | 11/1993 | Merkel et al. |
| 5,270,270 A | 12/1993 | Semar et al. |
| 5,376,602 A | 12/1994 | Nilsen |
| 5,567,663 A | 10/1996 | Kotani et al. |

FOREIGN PATENT DOCUMENTS

| | | |
|---|---|---|
| DE | 19849340 | 4/1999 |
| JP | 51037908 | 3/1976 |
| JP | 58079869 | 5/1983 |
| JP | 07196363 | 8/1995 |

*Primary Examiner*—Karl Group
(74) *Attorney, Agent, or Firm*—Timothy M. Schaeberle; Kees van der Sterre

(57) ABSTRACT

The invention is directed at sintered ceramic articles exhibiting a primary crystalline phase of cordierite and an analytical oxide composition, in weight percent, of 44–53% $SiO_2$, 30–38 $Al_2O_3$, 11–16% MgO and 0.05 to 10% of a metal oxide. The ceramic article exhibits a coefficient of thermal expansion in at least one direction no greater than about $15.0 \times 10^{-7}$° C. over the temperature range of about 25° C. to about 800° C. The sum of the weight percentages of residual mullite, corundum, and spinel, as measured by X-ray diffractometry of the crushed and powdered body, is not greater than 15%. Furthermore, the invention discloses a method of producing the aforementioned ceramic body, comprising (a) selecting a raw material batch mixture for forming the cordierite ceramic body, comprising two or more compounds which serve as an alumina source, a silica source and a magnesia source, and at least one metal oxide source in an amount to result in the cordierite body comprising, on an analytical oxide basis, in weight percent, between about 0.05–10% of the metal oxide;

(b) adding an organic binder system to the inorganic mixture and forming the mixture into a green body;

(c) drying the green body and thereafter firing the green body at a time and at a temperature no greater than about 1300° C. to result in sintered ceramic body.

Preferred metal oxide sources include the oxides or oxide-forming compounds of the metals selected from the group consisting of molybdenum, tungsten, bismuth, copper, yttrium, lanthanide metals and boron.

4 Claims, 1 Drawing Sheet

LOW SINTERING TEMPERATURE CORDIERITE BATCH AND CORDIERITE CERAMIC PRODUCED THEREFROM

This application claims the benefit of U.S. Provisional Application No. 60/114,420, filed Dec. 31, 1998, entitled "Low Sintering Temperature Cordierite Batch and Cordierite Ceramic Produced Therefrom", by Gregory A. Merkel.

BACKGROUND OF THE INVENTION

1. Field of the Invention

The invention relates to cordierite forming batch mixtures that are capable of being sintered at greatly reduced sintering temperatures to form cordierite ceramics, and to cordierite bodies, having high thermal shock resistance, formed from the batch mixtures at reduced sintering temperatures.

2. Discussion of the Related Art

The exhaust gases emitted by internal combustion systems utilizing hydrocarbon fuels, such as hydrocarbon gases, gasoline or diesel fuel, can cause serious pollution of the atmosphere. Among the many pollutants in these exhaust gases are hydrocarbons and oxygen-containing compounds, the latter including nitrogen oxides (NOx) and carbon monoxide (CO). The automotive industry has for many years attempted to reduce the quantities of gaseous emissions from automobile engine systems, the first automobiles equipped with catalytic converters having been introduced in the mid 1970's.

Cordierite substrates, typically in the form of a honeycomb body, have long been preferred for use as substrates to support catalytically active components for catalytic converters on automobiles, in part, due to the high thermal shock resistance of cordierite ceramics. The cordierite substrates are coated with noble metal catalysts and placed in the path of the exhaust effluent of an automobile engine where the catalysts may act to convert hydrocarbons, CO and NOx to the non-toxic by-products water, carbon dioxide and reduced nitrogen species.

It is well known that the production of sintered cordierite ($2MgO.2Al_2O_3.5SiO_2$) ceramics typically involves the use of mineral batches containing sources of magnesium, aluminum and silicon, such as clay and talc. U.S. Pat. No. 3,885,977 discloses the manufacture of thermal-shock-resistant cordierite honeycomb ceramics from clay/talc batches by extruding the batches and firing the extrudate to provide ceramics with very low expansion coefficients along at least one axis. Disclosed therein, is the principle, which has been used commercially since, that in order to yield substantially complete reaction to the cordierite phase the firing of the cordierite body should occur between 1340° C. to 1450° C. for times between about 6–12 hours. In this commercially used sintering process, growth of the cordierite crystals typically begins at about 1250° C.

More recently it has been disclosed that lowered firing temperatures for the formation of cordierite can be obtained through a variety of different methods.

U.S. Pat. No. 4,888,314 discloses the preparation of a mixed alcoholic solution of magnesium, aluminum and silicon salts, all soluble in alcohol or a solvent miscible with alcohol. A hydrolyzing agent is thereafter added to the solution to form a gel, and the gel is thereafter subjected to a first thermal treatment at a temperature not exceeding 450° C. and to a second thermal treatment between 450° C. and 900° C. resulting in the formation of a cordierite type ceramic powder. The cordierite type ceramic powder is sintered at a temperature between about 800° C. to 1050° C. resulting in a cordierite ceramic body having a coefficient of thermal expansion of less than about $10 \times 10^{-7}/°$ C.

U.S. Pat. No. 5,173,455 discloses the formation of Group IIA-Group IIIA metal-silicon mixed liquid alkoxide which is hydrolyzed, distilled, dried, milled and thereafter doped with boron and phosphorous and sintered at a temperature of between about 825° C. to 875° C. to form crystalline cordierite ceramics.

Lastly R. W. Dupon et al. teach in "Low Temperature Route to Cordierite Ceramics Using a Reactive Liquid Phase Sintering Aid, Dense Body Preparation and Green Tape Fabrication (J. Am. Ceram. Soc., 73 [2] 335–339, 1990) the use of 2–10 atomic percent Bi, equivalent to 8.05 to 30.47 weight percent $Bi_2O_3$, as a flux to promote the formation cordierite at temperatures of about 1000° C. from a mixture of colloidal silica and colloidal spinel. The dense cordierite bodies disclosed therein exhibit coefficients of thermal expansion of $15 \times 10^{-7}/°$ C. over the temperature range of 25 to 400° C.

While the foregoing references indicate that there have been some attempts and some progress in reducing the sintering temperatures of cordierite ceramics, it is evident that still further work is required to find simpler, and lower sintering temperature methods of forming cordierite ceramics having low coefficients of thermal expansion and the requisite adequate thermal shock resistance necessary for high temperature applications required today. Ideally, it would be useful to have sinterable ceramic batch compositions simply capable of being fired to form cordierite bodies having a low coefficient of thermal expansion, at temperatures of no greater than about 1300° C. To date, no combination of sintering aids or methods have been discovered which are effective to reliably produce low CTE cordierite ceramics at these low sintering temperatures.

SUMMARY OF THE INVENTION

It has now surprisingly been found that the when specific metal oxides are utilized in the preparation of cordierite bodies, the above mentioned low firing temperatures can be utilized to form low thermal expansion cordierite bodies. Specifically, it has been found that the addition of a metal oxide to a cordierite-forming raw material batch mixture can be utilized to produce cordierite bodies at sintering temperatures of no greater than about 1300° C.

The sintered ceramic article of the invention exhibits a primary crystalline phase of cordierite and an analytical oxide composition, in weight percent, of 44–53% $SiO_2$, 30–38% $Al_2O_3$, 11–16% MgO and 0.05 to 10% of a metal oxide. The ceramic article exhibits a coefficient of thermal expansion in at least one direction no greater than about $15.0 \times 10^{-7}/°$ C. over the temperature range of about 25° C. to about 800° C. The sum of the weight percentages of residual mullite, corundum, and spinel, as measured by X-ray diffractometry of the crushed and powdered body, is not greater than 15%.

This invention additionally relates to batch mixture for use in preparing a cordierite ceramic body having as its primary crystalline phase cordierite and comprising an analytical oxide composition, in weight percent, of 44–53% $SiO_2$, 30–38% $Al_2O_3$, 11–16% MgO, the batch mixture comprising the following:

(a) a raw material batch mixture for forming the cordierite ceramic body, comprising two or more compounds which serve as an alumina source, a silica source and a magnesia source, and at least one metal oxide source in an amount to result in the cordierite body comprising, on an analytical oxide basis, in weight percent, between about 0.05–10% of the metal oxide;

(b) an organic binder component in an amount between 2 and 50 parts by weight based on the total raw material mixture.

This invention also relates to a method of producing a ceramic body having cordierite as its primary phase, comprising selecting the aforementioned raw materials, including the metal oxide source and adding an organic binder system to the raw material mixture and thereafter kneading and shaping the mixture to form a green body. The method involves thereafter drying and firing the green body at a time and at a temperature of no greater than about 1300° C. to result in a sintered ceramic body in which the sum of the residual mullite+spinel+corundum is no more than 15% and that exhibits the aforementioned coefficient of thermal expansion.

Metal oxide sources suitable for use in the above inventions include the oxides or oxide-forming compounds of the metals selected from the group consisting of molybdenum, tungsten, bismuth, copper, yttrium, lanthanide metals and boron.

DETAILED DESCRIPTION OF THE INVENTION

Figure 1:
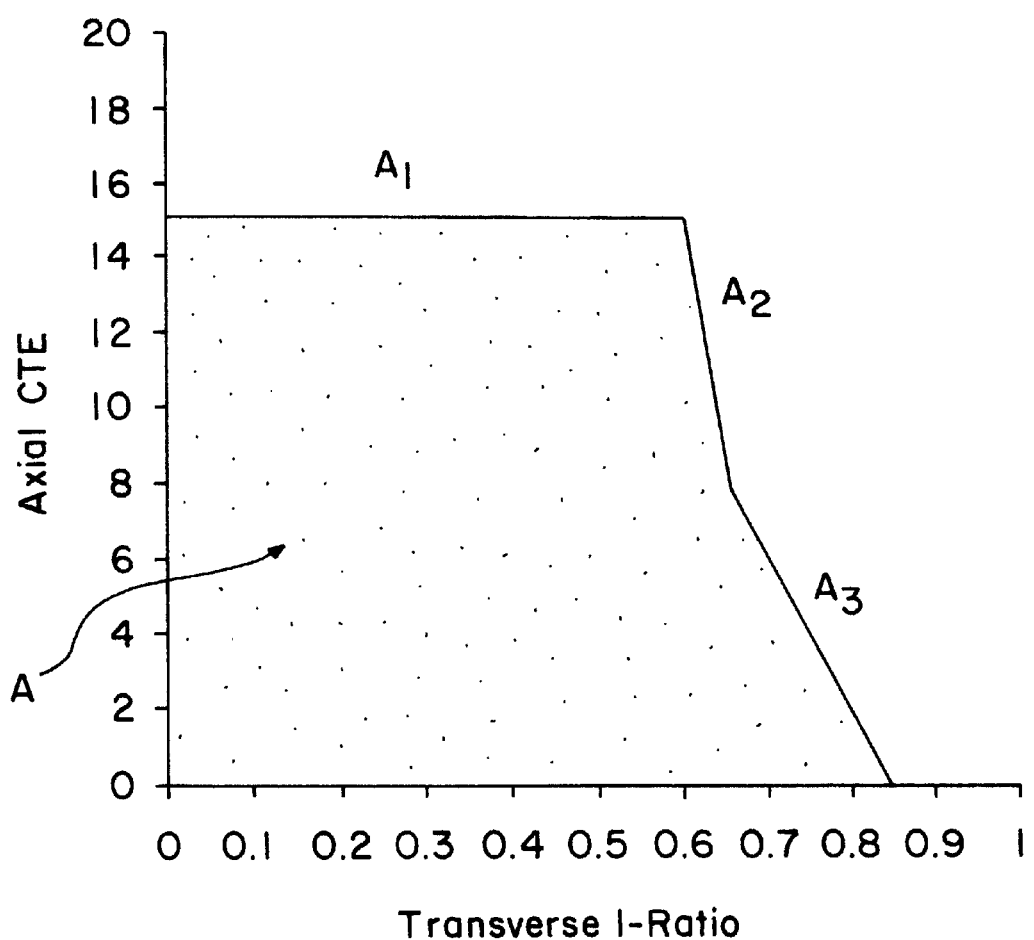
FIG. 1 is a graphical illustration of the mean CTE from 25° C. to 800° C., as measured parallel to the direction of the channels of a cordierite honeycomb ceramic body, versus the transverse I-ratio relationship region which encompasses certain of the inventive embodiments containing at least a portion of a molybdenum oxide source as a component of the metal oxide source.

The present invention relates to ceramic articles exhibiting a primary crystalline phase of cordierite and to a method of producing these articles using a selected combination of cordierite forming raw materials comprising specified sources of alumina, magnesia, silica and a source of at least one metal oxide. Specifically, the inventive ceramic articles are formed from a plasticizable batch mixture comprised of raw materials and the relative amounts of each selected to form the sintered ceramic article comprising, on an analytical oxide basis, by weight, of about 44–53% $SiO_2$, 30–38% $Al_2O_3$, 11–16% MgO and 0.05 to 10% of a metal oxide.

As previously mentioned, it has been found that by utilizing the specific cordierite-forming raw materials and the metal oxide, the mixture described herein results in ceramic articles capable of being fired at temperatures of no greater than about 1300° C., characterized by a primary crystalline phase of cordierite, having CTE of less than about $15.0 \times 10^{-7}$/° C. at 25° C. to 800° C., and more preferably ceramic bodies having a CTE of less than about $5.0 \times 10^{-7}$/° C. at 25° C. to 800° C.

In accordance with the present invention, provided is a plasticizable mixture for use in preparing the ceramic article above with the raw material mixture comprising sources of alumina, magnesia, and silica, and the metal oxide. In a preferred embodiment, at least a portion of the silica, and at least a portion of the alumina, are provided in the form of kaolin, in which the kaolin comprises either calcined or raw kaolin, and furthermore, a portion of the silica and at least a portion of the magnesia are provided in the form of a talc.

Metal oxide as used herein is taken to mean a metal oxide or oxide forming compound capable of substantially enhancing the rate of reaction of the raw materials, thereby promoting the complete or nearly complete formation of cordierite at or below 1300° C., without sacrificing the CTE and thermal shock resistance of the cordierite ceramic body. The metal oxide is added to the silica, alumina and magnesia containing raw materials in an amount such that the resultant ceramic cordierite article comprises, on an analytical oxide weight basis about 0.05 to 10% of the metal oxide. The metal oxides for use in the instant invention includes materials selected from the group consisting of the oxides or oxide-forming compounds of the metals selected from the group consisting of molybdenum, tungsten, bismuth, copper, yttrium, lanthanide metals and boron. In a preferred embodiment, the metal oxide comprises a mixture of an oxide or oxide-forming compound of tungsten and an oxide or oxide-forming compound of a second metal selected from the group consisting of molybdenum, bismuth, copper, yttrium, lanthanide metals and boron.

Cordierite ceramic bodies formed from raw materials whose particle shapes are anisotropic, that is, ellipsoidal, tabular, platey, rod-shaped, or fibrous, often exhibit a preferred orientation of the cordierite crystals. Specifically, the c-axes of the cordierite crystals tend to preferentially lie within the plane that is perpendicular to the shortest morphological axes of the raw materials. For example, in a sheet-like, plate-like, or honeycomb-shaped body formed by extrusion, tape casting, calendaring, or injection molding, the flow of the raw material particles tends to result in the orientation of these particles with their short morphological axes perpendicular to the plane of the sheet or plate or to the planes of the cell walls. As a result, the cordierite crystals that form from these raw materials preferentially grow with their c-axes lying within the plane of the sheet, plate, or cell walls.

Ceramists have found it convenient to quantify the degree of preferred orientation of the cordierite crystals by measurement of the so-called "I-ratio" using X-ray diffractometry. The I-ratio is defined as $I_{(110)}/(I_{(110)}+I_{(002)})$, where $I_{(110)}$ and $I_{(002)}$ are the intensities of the X-ray reflections from the (110) and (002) lattice planes in the cordierite crystals as measured on a flat surface or cross section of the honeycomb body. These X-ray reflections are based on hexagonal indexing. The I-ratio, as defined above, is first used in U.S. Pat. No. 3,885,977 to describe the degree of preferred orientation. The I-ratio, when measured on the as-fired planar surface of a honeycomb wall, is referred to as the "transverse I-ratio." When the I-ratio is measured on a cross section perpendicular to the direction of the channels, it is referred to as the "axial I-ratio." It has been found that randomly oriented cordierite crystals yield an I-ratio of about 0.655. Transverse I-ratios between 0.655 and 1.0 indicate a progressively oriented cordierite body having a greater fraction of cordierite crystals lying with their c-axes in the plane of the wall; i.e., more (110) reflections, fewer (002) reflections. Transverse I-ratios less than 0.655 imply a tendency toward "reverse orientation" of the cordierite crystals lying with their c-axes perpendicular to the surface of the wall. High values of the transverse I-ratio, that is, bodies in which the cordierite c-axes are highly oriented within the plane of the cell walls, are conventionally associated with low CTE.

In a further embodiment of the present invention, the metal oxide comprises at least a portion of an oxide or oxide-forming compound of molybdenum, preferably a mixture of a molybdenum oxide-forming source and an additional metal oxide comprising either tungsten or bismuth oxide or both. Honeycomb ceramic articles formed utilizing molybdenum oxide often exhibit a transverse I-ratio of 0.75 or less, and preferably exhibit a transverse I-ratio less than 0.70. However, despite these low transverse I-ratios, molybdenum-containing bodies exhibit unexpectedly low coefficients of thermal expansion. Low-CTE bodies with transverse I-ratios between 0.60 and 0.70, which imply near random net orientation of the cordierite crystals comprising the body, are expected to have especially excellent thermal shock resistance because the CTE will be low in all directions within the cordierite ceramic body.

In a further embodiment, the metal oxide comprises at least a 0.05% of molybdenum oxide, preferably a mixture of at least 0.05% molybdenum oxide and an additional metal oxide comprising either tungsten or bismuth oxide or both. In one embodiment the honeycomb ceramic articles formed utilizing this molybdenum oxide are characterized by the axial CTE, that is, the CTE parallel to the direction of the channels, versus transverse I-ratio relationship region designated A as illustrated in FIG. 1. Specifically, the three boundaries of this region designated A1, A2 and A3, are respectively, as follows: (1) a CTE of less than about $15.0 \times 10^{-7}/°$ C. at 25° C. to 800° C., with the I-ratio no greater than 0.60; (2) a CTE over the temperature range of about 25° C. to about 800° C. of no greater than that value defined by the following equation: CTE $(10^{-7}/°$ C.)=90–125 (transverse I-ratio), with the I-ratio greater than 0.60 but no greater than about 0.66; and, (3) a CTE over the temperature range of about 25° C. to about 800° C. of no greater than that value defined by the following equation: CTE$(10^{-7}/°$ C.)= 35–41.667(transverse I-ratio), with the I-ratio greater than 0.66.

The alumina source is a chemical compound that contains both aluminum and oxygen. Acceptable alumina sources include, but are not restricted to, kaolin, calcined kaolin, spinel, and an $Al_2O_3$-forming source. An $Al_2O_3$-forming source, for the purposes of the instant invention is a compound which, when heated, forms $Al_2O_3$. Acceptable $Al_2O_3$-forming sources include a material selected from the group consisting of alumina, aluminum hydroxide, aluminum oxyhydroxide, and combinations thereof. A particularly preferred source comprises a highly reactive α-alumina or aluminum hydroxide having a median particle diameter of about one micron or less, as measured by a sedimentation technique, and exhibiting a surface area greater than 5 $m^2/g$. More preferably, the $Al_2O_3$ forming materials exhibit a surface area greater than 40 $m^2/g$, including materials selected from the group consisting of "transition" or activated aluminas, such as gamma alumina, and aluminum oxyhydroxide; preferably the high surface area $Al_2O_3$-forming source comprises boehmite or psuedoboehmite.

The magnesia source can simply comprise a calcined magnesium oxide, as well as magnesium hydroxide, magnesium carbonate, magnesium nitrate and combinations of these. Other sources of magnesia include, but are not limited to, talc, calcined talc, and spinel. In a preferred embodiment, the magnesia source is a calcined or uncalcined platy talc having a median particle diameter of less than about 4 μm as measured by a sedimentation technique. Platy talc as used herein is a talc that exhibits a platelet particle morphology, that is, particles having two long dimensions and one short dimension, or, a length and width of the platelet that are much larger than its thickness. It is preferred that the talc possess a morphology index greater than about 0.75. The morphology index (refer to U.S. Pat. No. 5,141,686) is a measure of the degree of platiness of the talc. One typical procedure for measuring the morphology index is to place the sample in a holder so that the orientation of the platy talc is maximized within the plane of the sample holder. The x-ray diffraction pattern is then determined for this oriented talc. The morphology index, M, semi-quantitatively relates the platy character of the talc to its XRD peak intensities using the following equation: $M = I_x(I_x + 2I_y)^{n-1}$, where $I_x$ is the intensity of the (004) peak and $I_y$ is that of the (020) reflection.

Silica sources include, but are not restricted to, kaolin, calcined kaolin, talc, calcined talc, a crystalline or amorphous silica or compound which, when heated, yields silica. When the silica is provided as a crystalline or amorphous silica, it is preferred that the median particle diameter is not greater than about 6 μm as measured by a sedimentation technique.

The aforementioned raw material batch comprising cordierite-forming raw materials including the metal oxide is combined in a mixing step sufficient to produce an intimate mixing of the raw material phases to allow complete reaction in thermal processing. A binder system may be added before, during, or after the mixing step, and the raw material batch plus binder system is shaped into a green body by any known conventional ceramic forming process, such as, e.g., extrusion, injection molding, slip casting, centrifugal casting, pressure casting, dry pressing, etc. A preferred binder system for use in creating an extrudable mixture in the present invention comprises a cellulose ether binder component selected from the group consisting of methylcellulose, methylcellulose derivatives, and combinations thereof, a surfactant component, preferably stearic acid or sodium stearate, and a solvent comprising water. Excellent results have been obtained utilizing a binder system which comprises the following amounts, assuming 100 parts by weight of the raw material mixture: about 0.2 to 2 parts by weight of the sodium stearate, about 2.5 to 10.0 parts by weight of a methylcellulose or a hydroxypropyl methylcellulose binder, and about 20 to 50 parts by weight of the water.

For the preparation of a thin-walled honeycomb substrate suitable for use as a catalyst support or a ceramic filter, the resulting stiff, uniform and extrudable batch mixture is shaped into a green body preferably by extrusion through a die.

The prepared ceramic green body is then dried prior to firing, by any conventional method such as hot-air drying or dielectric drying. The dried green body is thereafter fired at a sufficient temperature for a sufficient time to result in a fired ceramic body containing cordierite as its primary phase. The firing conditions can vary depending on the process conditions such as specific composition, size of the green body, and nature of the equipment. However, as mentioned above, a unique feature of this invention is the ability to fire the ceramic bodies at temperatures no greater than about 1300° C., while still achieving a sufficient reaction of the raw materials to form a ceramic body having a primary crystalline phase of cordierite, without sacrificing CTE and resistance to thermal shock of the ceramic body. Firing temperatures as low as 1200° C., and more preferably about 1100° C. to 1150° C. have been determined to be sufficient to form ceramic bodies containing a primary crystalline phase of cordierite. Preferably, the green ceramic body is fired to the low firing temperature of between 1150–1250° C. at a rate of between about 15 to 200° C. per hour, although firing rates of at least 1000° C. per hour may also be used. The ceramic body is held at that low firing temperature for a period of between 1 to 25 hours and preferably 1 to 10 hours, whereupon the fired ceramic body is cooled to room temperature at a cooling rate of about 100° C. to about 200° C. per hour. In another embodiment, the firing comprises a two stage firing process involving heating to a temperature of 1100° C. to 1150° C. and holding at this temperature for 1 to 10 hours and thereafter heating to a higher temperature of 1200° C. to 1300° C. and holding at this higher temperature for another 1 to 10 hours.

Numerous advantages are envisioned as a result of the utilization of the methods of forming cordierite ceramics requiring lower sintering temperatures, including the following: (1) reduction in the amount energy required to completely fire the cordierite ceramics, and thus a reduction in energy costs; (2) increase in the life of the refractory kiln lining, typically utilized in ceramic firing kilns; (3) the use of kiln furniture having a lower maximum use temperature and thus less expensive kiln furniture, i.e., aluminosilicate or cordierite-based materials as opposed to silicon carbide; (4) potentially shorter firing cycles associated with lower sintering temperatures that would allow for the faster throughput of the ceramic ware.

While not intending to be limited by theory, it is thought that the lowered firing temperature is enabled by the inclusion of the metal oxide which melts to form a liquid at or below 1300° C. or reacts with one or more of the raw materials in the raw material mixture at or below 1300° C. to form a liquid. The formation of this liquid at temperatures below about 1300° C. enhances the reaction of the raw materials and facilitates the formation of the cordierite phase. Furthermore, it is thought that the use of raw materials having high surface areas results in a raw material mixture exhibiting a high reactivity which also aids in the formation of the cordierite phase at lower than conventional sintering temperatures. It is also thought that the presence of this liquid phase promotes a nucleation and growth of the cordierite crystals in such a manner that the ceramic body contains extensive microcracking that lowers the coefficient of thermal expansion of the sintered article.

As indicated previously, a primary utility of the mixtures described herein is for preparing cordierite honeycomb substrates useful as catalyst carriers. Although the invention is particularly advantageous for preparing thin-walled honeycombs, the claimed mixtures can also be used for thicker walled structures. Methods of applying catalysts to the honeycomb structures, and utilizing those structures, for example, in automobile exhaust systems, are well known in the art. The mixtures may also be useful for preparing other high strength cordierite structures, such as filters and heat exchangers.

EXAMPLES

To further illustrate the principles of the present invention, there will be described several examples of the ceramic bodies formed according to the invention. However, it is to be understood that the examples are given for illustrative purpose only, and the invention is not limited thereto, but various modifications and changes may be made in the invention, without departing from the spirit of the invention.

Examples 1–47

Inorganic powder batch mixtures, as listed in parts by weight, suitable for the formation of a ceramic body having cordierite as its primary crystalline phase are listed in Tables 1 to 8. Each of compositions 1–47 was prepared by combining and dry mixing together the components of the designated raw material inorganic mixture as listed in Tables 1 to 8 including the metal oxide. To these mixtures were added 4 to 6% methylcellulose and 1% sodium stearate and this intermediate mixture was thereafter further mixed with 20 to 50% deionized water to form a plasticized ceramic batch mixture. The metal oxide and binder system components are provided in parts by weight, based on 100 parts of the cordierite-forming raw materials.

Table 9 reports various properties of the commercially available raw materials utilized in the examples, specifically those properties discussed as being important in contributing to the low sintering temperature or low CTE of the cordierite examples. Included in the table are the following important raw material characteristic properties: morphology index of the talc, the surface area ($m^2/g$) and median particle diameter ($\mu m$) as measured by either a sedimentation technique or laser diffraction technique.

Each of the various plasticized mixtures was extruded under conditions suitable to form 1.0 inch (25.4 mm) diameter honeycomb bodies having either 400 cells/in$^2$ (62 cells/cm2) and 8 mil (0.20 mm) thick cell walls or 200 cells/in$^2$ (31 cells/cm2) and 14 mil (0.36 mm) thick cell walls, and also solid rods having a diameter of 5/16 in. (7.9 mm). The green honeycombs and rods formed from each of the batch compositions were dried to remove any water or liquid phases that might be present. The honeycombs and the rods were thereafter cut to 3 inch and 6 inch (7.6 to 15.2 cm) lengths, respectively, and subjected to a heating and firing cycle in an electric furnace sufficient to remove the organic binder system from, and to sinter, the rods and honeycombs. Specifically, the green bodies, rods and honeycombs, were fired to a temperature of between 1100° C. to 1250° C. and held for a period of about 1 to 10 hours and thereafter cooled to room temperature; i.e., firing conditions suitable for forming ceramic bodies having cordierite as their primary phase. Heating times to maximum temperature were 21.5 to 23.5 hours unless otherwise noted.

Tables 1 to 8 additionally report selected properties for the ceramics produced from the batches reported in the Tables. Reported therein is the average coefficient of thermal expansion (CTE), over the temperature range from 25° C. to 800° C. ($10^{-7}/°$ C.), as measured by dilatometry in the direction parallel to the lengths of the channels of the honeycomb body. Additionally reported are the volume percent open porosity and the median pore diameter of the so-fired ceramic bodies, as measured by mercury porosimetry, and the modulus of rupture (MOR) of the solid rods as measured by four-point loading. For some examples, the amounts of metal oxide low temperature sintering agents remaining in body after firing are also reported. Weight percentages of residual metal oxide liquid-phase sintering additives in the fired bodies were measured by plasma atomic emission spectroscopy. Tables 1 to 8 also report the transverse I-ratios of the cordierite ceramic bodies and the weight percentages of residual unreacted mullite, corundum ($\alpha$-alumina), and spinel ($MgAl_2O_4$) in the fired bodies as measured by powder x-ray diffractometry.

TABLE 1

| EXAMPLE NUMBER | 1* | 2* | 3 | 4 | 5 | 6 | 7 | 8 |
|---|---|---|---|---|---|---|---|---|
| INORGANICS | | | | | | | | |
| Talc 1 | — | 40.01 | 40.01 | 40.01 | 40.01 | — | 41.51 | 41.51 |
| Talc 2 | — | — | — | — | — | 40.01 | — | — |
| Talc 3 | 40.38 | — | — | — | — | — | — | — |
| Calcined Kaolin 1 | 19.25 | 28.98 | 28.98 | 28.98 | 28.98 | 28.98 | 30.06 | 30.06 |
| Raw Kaolin 1 | 15.28 | 13.96 | 13.96 | 13.96 | 13.96 | 13.96 | 14.48 | 14.48 |

TABLE 1-continued

| EXAMPLE NUMBER | 1* | 2* | 3 | 4 | 5 | 6 | 7 | 8 |
|---|---|---|---|---|---|---|---|---|
| Coarse α-alumina | 14.13 | — | — | — | — | — | — | — |
| Fine α-alumina | 4.71 | — | — | — | — | — | 13.94 | 13.94 |
| Boehmite | — | 17.05 | 17.05 | 17.05 | 17.05 | 17.05 | — | — |
| Quartz | 6.25 | — | — | — | — | — | — | — |
| METAL OXIDE | | | | | | | | |
| $Bi_2O_3$ | — | — | 1.0 | 2.0 | 2.0 | 2.0 | 2.0 | 8.0 |
| SOAK TEMPERATURE (° C.) | 1200 | 1200 | 1150 | 1150 | 1100 | 1150 | 1150 | 1150 |
| SOAK TIME (hours) | 10 | 10 | 10 | 10 | 10 | 10 | 10 | 10 |
| FIRED PROPERTIES | | | | | | | | |
| CTE ($10^{-7}$/° C.) | 69.6 | — | 12.0 | 9.2 | 7.6 | 10.9 | 12.0 | 7.7 |
| Transverse I-Ratio | — | — | 0.91 | 0.88 | 0.86 | 0.91 | 0.86 | 0.94 |
| Percent Mullite | 5.5 | 2.4 | 1.0 | 0.0 | 0.8 | 1.6 | 0.9 | 0.0 |
| Percent Corundum | 17.2 | 0.0 | 0.0 | 0.0 | 0.0 | 0.0 | 0.0 | 0.0 |
| Percent Spinel | 7.1 | 15.9 | 1.7 | 0.5 | 0.8 | 1.1 | 0.8 | 1.4 |
| Percent Open Porosity | — | — | — | 33.5 | — | — | — | — |
| Median Pore Diameter (μm) | — | — | — | 0.93 | — | — | — | — |
| Percent $Bi_2O_3$ | — | — | — | — | 2.00 | — | — | — |

*Comparison Example

TABLE 2

| EXAMPLE NUMBER | 9 | 10 | 11 | 12 | 13 | 14 |
|---|---|---|---|---|---|---|
| INORGANICS | | | | | | |
| Talc 1 | 40.01 | 40.01 | 40.01 | 41.51 | 41.51 | 40.01 |
| Calcined Kaolin 1 | 28.98 | 28.98 | 28.98 | 30.06 | 30.06 | 28.98 |
| Raw Kaolin 1 | 13.96 | 13.96 | 13.96 | 14.48 | 14.48 | 13.96 |
| Fine α-alumina | — | — | — | 13.94 | 13.94 | — |
| Boehmite | 17.05 | 17.05 | 17.05 | — | — | 17.05 |
| METAL OXIDE | | | | | | |
| $Bi_2O_3$ | — | — | — | — | — | 0.5 |
| $MoO_3$ | 0.5 | 1.0 | 2.0 | 2.0 | 8.0 | 0.5 |
| SOAK TEMPERATURE (° C.) | 1100 | 1150 | 1150 | 1150 | 1150 | 1150 |
| SOAK TIME (hours) | 10 | 10 | 10 | 10 | 10 | 10 |
| FIRED PROPERTIES | | | | | | |
| CTE ($10^{-7}$/° C.) | 13.4 | 8.2 | 12.2 | 12.4 | 6.0 | 10.7 |
| Transverse I-Ratio | 0.52 | 0.56 | 0.56 | 0.57 | 0.63 | 0.74 |
| Percent Mullite | 1.0 | 0.6 | 0.6 | 1.0 | 0.6 | 0.0 |
| Percent Corundum | 0.0 | 0.0 | 0.0 | 0.0 | 0.0 | 0.0 |
| Percent Spinel | 2.0 | 1.0 | 0.0 | 1.4 | 0.0 | 0.5 |
| Percent $MoO_3$ | — | — | 0.41 | 0.21 | — | — |

TABLE 3

| EXAMPLE NUMBER | 15 | 16 | 17 | 18 | 19 | 20 | 21 | 22 |
|---|---|---|---|---|---|---|---|---|
| INORGANICS | | | | | | | | |
| Talc 1 | 40.01 | 40.01 | 40.01 | 40.01 | 40.01 | — | 40.01 | — |
| Talc 2 | — | — | — | — | — | — | — | 40.01 |
| Talc 3 | — | — | — | — | — | 40.86 | — | — |
| Calcined Kaolin 1 | 28.98 | 28.98 | 28.98 | 28.98 | 28.98 | — | 28.98 | 28.98 |
| Calcined Kaolin 2 | — | — | — | — | — | 29.68 | — | — |
| Raw Kaolin 1 | 13.96 | 13.96 | 13.96 | 13.96 | 13.96 | 12.04 | 13.96 | 13.96 |
| Fine α-alumina | — | — | — | — | — | 15.43 | — | — |
| Boehmite | 17.05 | 17.05 | 17.05 | 17.05 | 17.05 | — | 17.05 | 17.05 |
| Quartz | — | — | — | — | — | 2.00 | — | — |
| METAL OXIDE | | | | | | | | |
| $Bi_2O_3$ | — | — | — | — | — | — | 1.0 | 1.0 |
| $MoO_3$ | — | 0.5 | 1.5 | 0.5 | 1.5 | 1.5 | — | — |

TABLE 3-continued

| EXAMPLE NUMBER | 15 | 16 | 17 | 18 | 19 | 20 | 21 | 22 |
|---|---|---|---|---|---|---|---|---|
| $WO_3$ | 2.0 | 0.5 | 0.5 | 1.5 | 1.5 | 0.5 | 1.0 | 1.0 |
| SOAK TEMPERATURE (° C.) | 1150 | 1150 | 1150 | 1150 | 1150 | 1200 | 1150 | 1150 |
| SOAK TIME (hours) | 10 | 10 | 10 | 10 | 10 | 10 | 10 | 10 |
| FIRED PROPERTIES | | | | | | | | |
| CTE ($10^{-7}$/° C.) | 5.8 | 6.8 | 2.7 | 3.8 | 2.1 | 4.7 | 1.5 | 1.6 |
| Transverse I-Ratio | 0.76 | 0.56 | 0.63 | 0.60 | 0.58 | 0.68 | 0.80 | — |
| Percent Mullite | 0.6 | 0.5 | 0.5 | 0.0 | 0.7 | 0.6 | 0.8 | 0.8 |
| Percent Corundum | 0.0 | 0.0 | 0.0 | 0.0 | 0.0 | 0.0 | 0.0 | 0.0 |
| Percent Spinel | 1.6 | 1.5 | 0.7 | 0.5 | 0.0 | 3.2 | 1.1 | 2.1 |
| Percent Open Porosity | — | 26.9 | 34.2 | 25.8 | 32.4 | 29.8 | 29.0 | 30.8 |
| Median Pore Diameter ($\mu$m) | — | 0.52 | 0.72 | 0.54 | 0.71 | 1.04 | 0.94 | 1.13 |
| Percent $Bi_2O_3$ | — | — | — | — | — | — | 0.76 | — |
| Percent $MoO_3$ | — | 0.06 | 0.21 | 0.25 | 0.33 | 0.18 | — | — |
| Percent $WO_3$ | 1.73 | 0.32 | 0.35 | 1.34 | 1.16 | 0.37 | 0.86 | — |

TABLE 4

| EXAMPLE NUMBER | 23 | 24 | 25 | 26 | 27 | 28 |
|---|---|---|---|---|---|---|
| INORGANICS | | | | | | |
| Talc 1 | 41.51 | — | — | — | 40.01 | 40.01 |
| Talc 3 | — | 40.86 | 40.38 | 40.78 | — | — |
| Calcined Kaolin 1 | 30.06 | — | — | 26.48 | 28.98 | 28.98 |
| Calcined Kaolin 2 | — | 29.68 | — | — | — | — |
| Calcined Kaolin 3 | — | — | 19.25 | — | — | — |
| Raw Kaolin 1 | 14.48 | 12.04 | 15.28 | — | 13.96 | 13.96 |
| Raw Kaolin 2 | — | — | — | 15.37 | — | — |
| Coarse α-alumina | — | — | 14.13 | 15.35 | — | — |
| Fine α-alumina | 13.94 | 15.43 | 4.71 | — | — | — |
| Boehmite | — | — | — | — | 17.05 | 17.05 |
| Quartz | — | 2.00 | 6.25 | 2.03 | — | — |
| METAL OXIDE | | | | | | |
| $Bi_2O_3$ | 1.0 | 1.0 | 1.0 | 1.0 | 0.67 | 0.67 |
| $MoO_3$ | — | — | — | — | 0.67 | 0.67 |
| $WO_3$ | 1.0 | 1.0 | 1.0 | 1.0 | 0.67 | 0.67 |
| SOAK TEMPERATURE (° C.) | 1150 | 1150 | 1150 | 1150 | 1150 | 1100 |
| SOAK TIME (hours) | 10 | 10 | 10 | 10 | 10 | 10 |
| FIRED PROPERTIES | | | | | | |
| CTE ($10^{-7}$/° C.) | 2.4 | 6.9 | 6.2 | 6.5 | 3.7 | 5.1 |
| Transverse I-Ratio | — | 0.73 | — | — | 0.55 | — |
| Percent Mullite | 0.7 | 0.5 | 0.0 | 0.0 | 0.7 | 0.9 |
| Percent Corundum | 0.0 | 0.0 | 1.3 | 0.7 | 0.0 | 0.0 |
| Percent Spinel | 0.0 | 2.7 | 2.9 | 3.3 | 0.0 | 0.5 |
| Percent Open Porosity | 40.5 | 28.0 | 33.3 | 37.2 | 32.7 | — |
| Median Pore Diameter ($\mu$m) | 1.33 | 1.26 | 2.34 | 2.76 | 0.94 | — |
| Modulus of Rupture at 25° C. (psi) | — | 3163 | 2479 | 2082 | — | — |
| Percent $Bi_2O_3$ | — | 0.81 | 0.79 | 0.84 | 0.46 | — |
| Percent $MoO_3$ | — | — | — | — | 0.29 | — |
| Percent $WO_3$ | — | 0.65 | 0.77 | 0.78 | 0.59 | — |

TABLE 5

| EXAMPLE NUMBER | 29 | 30 | 31 | 32 |
|---|---|---|---|---|
| INORGANICS | | | | |
| Talc 1 | 40.01 | 40.01 | 40.01 | 40.01 |
| Calcined Kaolin 1 | 28.98 | 28.98 | 28.98 | 28.98 |
| Raw Kaolin 1 | 13.96 | 13.96 | 13.96 | 13.96 |
| Boehmite | 17.05 | 17.05 | 17.05 | 17.05 |
| METAL OXIDE | | | | |
| $B_2O_3$ | 2.0 | — | — | — |
| CuO | — | 2.0 | — | — |
| $Cu_2O$ | — | — | 2.0 | — |
| $Y_2O_3$ | — | — | — | 2.0 |
| SOAK TEMPERATURE (° C.) | 1150 | 1150 | 1150 | 1200 |
| SOAK TIME (hours) | 10 | 10 | 10 | 10 |
| FIRED PROPERTIES | | | | |
| CTE ($10^{-7}$/° C.) | 14.9 | 8.8 | 8.8 | 14.6 |
| Transverse I-Ratio | 0.81 | 0.89 | 0.91 | 0.85 |
| Percent Mullite | 3.1 | 0.7 | 0.5 | 2.2 |
| Percent Corundum | 0.0 | 0.0 | 0.0 | 0.0 |
| Percent Spinel | 1.7 | 0.0 | 0.0 | 2.8 |

TABLE 6

| EXAMPLE NUMBER | 33 | 34 | 35 | 36 | 37 | 38 |
|---|---|---|---|---|---|---|
| INORGANICS | | | | | | |
| Talc 1 | 40.01 | 40.01 | 40.01 | 40.01 | 40.01 | 40.01 |
| Calcined Kaolin 1 | 28.98 | 28.98 | 28.98 | 28.98 | 28.98 | 28.98 |
| Raw Kaolin 1 | 13.96 | 13.96 | 13.96 | 13.96 | 13.96 | 13.96 |
| Boehmite | 17.05 | 17.05 | 17.05 | 17.05 | 17.05 | 17.05 |
| METAL OXIDE | | | | | | |
| $La_2O_3$ | 2.0 | — | — | 2.0 | 2.0 | — |
| $CeO_2$ | — | 2.0 | 2.0 | — | — | 2.0 |
| $MoO_3$ | — | — | 0.5 | 0.5 | — | — |
| $WO_3$ | — | — | — | — | 0.5 | 0.5 |
| SOAK TEMPERATURE (° C.) | 1250 | 1250 | 1150 | 1250 | 1150 | 1150 |
| SOAK TIME (hours) | 10 | 10 | 10 | 10 | 10 | 10 |
| FIRED PROPERTIES | | | | | | |
| CTE ($10^{-7}$/° C.) | 7.9 | 4.8 | 4.9 | 5.5 | 3.6 | 4.7 |
| Transverse I-Ratio | 0.83 | 0.92 | 0.87 | 0.86 | 0.87 | 0.90 |
| Percent Mullite | 1.1 | 0.7 | 0.9 | 0.8 | 3.2 | 0.0 |
| Percent Corundum | 0.0 | 0.0 | 0.0 | 0.0 | 0.0 | 0.0 |
| Percent Spinel | 1.1 | 2.0 | 2.8 | 1.8 | 0.8 | 1.2 |
| Modulus of Rupture at 25° C. (psi) | — | — | 1902 | 1887 | 2505 | 2603 |
| Modulus of Rupture at 1200° C. (psi) | — | 5815 | 2855 | 2256 | 3441 | 4079 |

TABLE 7

| EXAMPLE NUMBER | 39 | 40 | 41 |
|---|---|---|---|
| INORGANICS | | | |
| Talc 1 | 42.35 | — | — |
| MgO | — | 13.30 | — |
| Spinel | — | — | 48.64 |
| Calcined Kaolin 1 | — | 24.96 | — |
| Raw Kaolin 1 | — | 51.82 | — |
| Fine α-alumina | 34.16 | — | — |
| Quartz | 23.49 | 9.91 | 51.36 |
| METAL OXIDE | | | |
| $Bi_2O_3$ | 1.0 | 1.0 | 1.0 |
| $WO_3$ | 1.0 | 1.0 | 1.0 |
| SOAK TEMPERATURE (° C.) | 1200 | 1200 | 1200 |
| SOAK TIME (hours) | 10 | 10 | 10 |
| FIRED PROPERTIES | | | |
| CTE ($10^{-7}$/° C.) | 10.2 | 11.8 | 6.0 |
| Transverse I-Ratio | 0.87 | 0.61 | 0.80 |
| Percent Mullite | 0.0 | 0.0 | 0.0 |
| Percent Corundum | 6.5 | 0.0 | 0.0 |
| Percent Spinel | 6.1 | 0.0 | 4.0 |

TABLE 8

| EXAMPLE NUMBER | 42 | 43 | 44 | 45 | 46 | 47 |
|---|---|---|---|---|---|---|
| INORGANICS | | | | | | |
| Talc 1 | 41.51 | 40.01 | — | 40.01 | 40.01 | 40.01 |
| Talc 2 | — | — | 41.51 | — | — | — |
| Calcined Kaolin 1 | 30.06 | 28.98 | 30.06 | 28.98 | 28.98 | 28.98 |
| Raw Kaolin 1 | 14.48 | 13.96 | 14.48 | 13.96 | 13.96 | 13.96 |
| Fine α-alumina | 13.94 | — | 13.94 | — | — | — |
| Boehmite | — | 17.05 | — | 17.05 | 17.05 | 17.05 |
| METAL OXIDE | | | | | | |
| $Bi_2O_3$ | 1.0 | — | — | — | — | — |
| $MoO_3$ | — | 1.5 | 1.0 | 1.5 | 0.5 | 1.5 |
| $WO_3$ | 1.0 | 0.5 | 0.5 | 0.5 | 1.5 | 1.5 |
| SOAK TEMPERATURE (° C.) | 1150 | 1150 | 1150 | 1250 | 1250 | 1250 |
| SOAK TIME (hours) | 3 | 3 | 3 | 3 | 3 | 3 |
| RAMP TIME (hours) | 6.6 | 6.6 | 6.6 | 7.4 | 7.4 | 7.4 |
| FIRED PROPERTIES | | | | | | |
| CTE ($10^{-7}$/° C.) | 7.1 | 9.4 | 10.4 | 5.0 | 7.7 | 4.3 |
| Transverse I-Ratio | 0.88 | — | — | — | — | — |
| Percent Mullite | 0.0 | 0.5 | 0.6 | 1.2 | 0.7 | 0.9 |
| Percent Corundum | 0.0 | 0.0 | 0.0 | 0.0 | 0.0 | 0.0 |
| Percent Spinel | 3.0 | 3.5 | 3.1 | 2.3 | 2.8 | 2.1 |

TABLE 9

|  | Morphology Index | Median Particle Diameter (μm) | | Surface Area (m²/g) |
|---|---|---|---|---|
|  |  | Sedimentation Technique | Laser Diffraction Technique |  |
| Talc 1 | 0.95 | 1.6 |  |  |
| Talc 2 | 0.95 | 3.4 |  |  |
| Talc 3 | 0.75 | 8.0 |  |  |
| MgO |  |  |  | 0.8 |
| Spinel |  |  |  | 1.0 |
| Calcined Clay 1 |  | 1.6 |  |  |
| Calcined Clay 2 |  | 0.7 |  |  |
| Calcined Clay 3 |  | 1.3 |  |  |
| Raw Kaolin 1 |  | 0.9 |  |  |
| Raw Kaolin 2 |  | 7.1 |  |  |
| Coarse α-alumina |  | 4.5 |  |  |
| Fine α-alumina |  | 0.4 |  | 9.4 |
| Boehmite |  | 0.1 |  | 180 |
| Quartz |  | 4.6 |  |  |

An examination of the results of Tables 1 to 8 reveals that incorporation of specific metal oxides allows for the formation of cordierite articles at sintering temperatures at or below 1300° C., specifically a sintering temperature of 1100° to 1250° C., without sacrificing the strength, coefficient of thermal expansion, or thermal shock resistance of the ceramic bodies. Specifically, each of the inventive composition Examples 3–47 exhibits a thermal expansion of less than about $15.0 \times 10^{-7}/°$ C., the CTE's ranging from $1.5 \times 10^{-7}/°$ C. to $14.9 \times 10^{-7}/°$ C.

Comparison Examples 1 and 2, representative of typical cordierite-forming ceramic batches, each lacking the metal oxide in the batch, and fired at lower than standard firing temperatures, specifically demonstrate that the absence of this metal oxide in the batch coupled with a lower than standard sintering temperature results in a ceramic body that contains greater than 15% mullite +spinel +corundum and that exhibits an undesirably high CTE.

Examples 3 to 8 demonstrate that the addition of $Bi_2O_3$ to raw material mixtures of talc, kaolin, calcined kaolin, and an $Al_2O_3$-forming source yields low thermal expansion bodies having less than 15% mullite+spinel+corundum when fired at only 1100° to 1150° C. The transverse I-ratios of these bodies are substantially greater than 0.655, indicating a predominance of cordierite crystals oriented with their c-axes lying in the plane of the honeycomb walls. Specifically, Example 4 shows that such bodies still contain substantial porosity, making them well suited for subsequent washcoating with a high surface area alumina based catalyst system and subsequent use as a catalytic converter substrate. Example 5 illustrates that essentially all of the bismuth is retained in the cordierite body after firing.

Examples 9 to 13 illustrate that the addition of $MoO_3$ to raw material mixtures of talc, kaolin, calcined kaolin, and an $Al_2O_3$-forming source also results in low expansion bodies with less than 15% mullite+spinel+corundum when fired at only 1100° to 1150° C. An unusual and unexpected feature of these bodies is that they exhibit transverse I-ratios which are less than 0.655, indicating a tendency for the cordierite crystals to be oriented with their c-axes perpendicular to the walls of the honeycomb body. This condition is referred to as "reverse orientation," a characteristic which alone would likely result in a CTE greater than $15.0 \times 10^{-7}/°$ C. However, these examples exhibit CTEs ranging from $6.0 \times 10^{-7}/°$ C. to $13.4 \times 10^{7}/°$ C., likely due to large amounts of microcracking. Examples 11 and 12 show that much of the molybdenum originally present in the raw material mixture is vaporized from the body during firing.

Example 14 shows that molybdenum and bismuth oxides may be used in combination to obtain low CTE cordierite ceramics when fired at only 1150° C. In this example, the tendency of the molybdenum to yield reverse-oriented cordierite crystals is partly offset by the presence of the bismuth which, alone, yields cordierite honeycomb bodies with high transverse I-ratios. The CTE of this example, $10.7 \times 10^{-7}/°$ C. is still unexpectedly low considering the low degree of planar-oriented cordierite.

Example 15 demonstrates that tungsten oxide is also effective in yielding low-CTE cordierite ceramic bodies when fired at only 1159° C. Furthermore, Examples 16 to 28 illustrate that combinations of tungsten oxide with molybdenum oxide, bismuth oxide, or both, yield cordierite bodies with especially low CTEs ranging from $1.5 \times 10^{-7}/°$ C. to $6.9 \times 10^{-7}/°$ when fired at 1100° to 1200° C. Examples 16 to 20 and Examples 27 and 28, all of which also contain molybdenum oxide, further show that these low expansions are accompanied by I-ratios of 0.55 to 0.68, indicating reverse orientation or near random orientation of the cordierite crystals. Examples 15 to 28 also illustrate that some of the molybdenum and most of the bismuth and tungsten remain in the bodies after firing. These examples further demonstrate that these bodies have sufficient porosity for subsequent washcoating with a high surface area alumina based catalyst system and subsequent use as a catalytic converter substrate. Examples 24 to 26 show that these bodies also possess good strengths.

Examples 29 to 32 show that the addition of $B_2O_3$, CuO, $Cu_2O$, or $Y_2O_3$ to a raw material mixture of talc, kaolin, calcined kaolin, and an $Al_2O_3$-forming source is effective in promoting cordierite formation at 1159° C. to 1200° C. to yield a low-CTE honeycomb body.

Examples 33 and 34 demonstrate that addition of lanthanide metal oxides, such as lanthanum oxide or cerium oxide, to a raw material mixture of talc, kaolin, calcined kaolin, and an alumina-forming source yields cordierite bodies with low coefficients of thermal expansion when fired at only 1250° C. Examples 35 to 38 show that the addition of lanthanide metal oxides in combination with other metal oxides, such as tungsten oxide or molybdenum oxide, allows further reduction in firing temperature and further lowering of CTE. Examples 34 to 38 also show that these fired bodies have useful strengths at room temperature, and that strengths at higher temperatures, such as 1200° C., are not lowered by the sintering additives, but are actually higher than the strengths at room temperature. The higher strengths at 1200° C. are believed to be due to the closing of the microcracks in the bodies during heating.

Example 39 demonstrates that the addition of $WO_3$ and $Bi_2O_3$ to a clay-absent raw material mixture consisting of talc, α-alumina, and quartz yields a low-expansion cordierite honeycomb body when fired at 1200° C.

Example 40 shows that $WO_3$ and $Bi_2O_3$ can be added to a talc-free raw material combination comprising MgO, kaolin, calcined kaolin, and quartz to yield a low-CTE cordierite body when fired at 1200° C.

Example 41 illustrates that addition of $WO_3$ and $Bi_2O_3$ to a raw material combination comprising spinel and quartz, containing neither clay nor talc, still results in a low-CTE cordierite ceramic when fired at 1200° C.

Finally, examples 42 to 47 demonstrate that nearly complete cordierite formation and low thermal expansion can be achieved for raw material combinations that contain either WO$_3$ and Bi$_2$O$_3$ or WO$_3$ and MoO$_3$ even when such bodies are fired at very fast heating rates to 1150° or 1250° C. and held at maximum temperature for only three hours, such that the total time from 25° C. until the end of the soak at peak temperature is less than eleven hours.

It should be understood that while the present invention has been described in detail with respect to certain illustrative and specific embodiments thereof, it should not be considered limited to such, as numerous modifications are possible without departing from the broad spirit and scope of the present invention as defined in the appended claims.

I claim:

1. A cordierite ceramic article having cordierite as its primary phase, consisting essentially, by weight on an analytical oxide basis, of about 44–53% SiO$_2$, 30–38% <Al$_2$O$_3$, 11–16% MgO, and 0.05% to less than about 4% of metal oxides, the metal oxides consisting of tungsten oxide in combination with at least one of molybdenum oxide and bismuth oxide, the article containing no greater than 15% by weight of mullite+spinel+corundum, and the article exhibiting a coefficient of thermal expansion in the range of about 1.5–6.9×10$^{-7}$/° C. over the temperature range of about 25° C. to about 800° C.

2. A cordierite ceramic article in accordance with claim 1 having a transverse I-ratio in the range of 0.55 to 0.68.

3. A cordierite ceramic article in accordance with claim 1 having a coefficient of thermal expansion no greater than about 5.0×10$^{-7}$/° C.

4. A cordierite ceramic article in accordance with claim 1 wherein the metal oxides include at least 0.05% molybdenum oxide, and wherein the cordierite ceramic article has a honeycomb, plate, or sheet form.

* * * * *

UNITED STATES PATENT AND TRADEMARK OFFICE
CERTIFICATE OF CORRECTION

PATENT NO.    : 6,391,813 B1
DATED         : May 21, 2002
INVENTOR(S)   : Merkel It is certified that error appears in the above-identified patent and that said Letters Patent is hereby corrected as shown below:

Column 17,
Line 16, "<All$_2$O$_3$" should be -- Al$_2$O$_3$ --

Signed and Sealed this

Fifteenth Day of October, 2002

Attest:

Attesting Officer

JAMES E. ROGAN
*Director of the United States Patent and Trademark Office*